(12) United States Patent  
Kim (10) Patent No.: US 10,779,679 B2  
(45) Date of Patent: Sep. 22, 2020

(54) ASSEMBLABLE GRILL AND GRILL BRIDGE HAVING SAME

(71) Applicant: Eun Ju Kim, Seoul (KR)

(72) Inventor: Eun Ju Kim, Seoul (KR)

( * ) Notice: Subject to any disclaimer, the term of this patent is extended or adjusted under 35 U.S.C. 154(b) by 263 days.

(21) Appl. No.: 15/766,235

(22) PCT Filed: Sep. 30, 2016

(86) PCT No.: PCT/KR2016/010985  
§ 371 (c)(1),  
(2) Date: May 4, 2018

(87) PCT Pub. No.: WO2017/061737  
PCT Pub. Date: Apr. 13, 2017

(65) Prior Publication Data  
US 2018/0317708 A1   Nov. 8, 2018

(30) Foreign Application Priority Data

Oct. 6, 2015   (KR) .................. 10-2015-0140103

(51) Int. Cl.  
*A47J 33/00* (2006.01)  
*F24B 13/02* (2006.01)  
(Continued)

(52) U.S. Cl.  
CPC .......... *A47J 33/00* (2013.01); *A47J 37/0763* (2013.01); *F24B 1/205* (2013.01); *F24B 13/02* (2013.01);  
(Continued)

(58) Field of Classification Search  
CPC .................. A47J 33/00; A47J 37/0763; A47J 2037/0795; A47J 2037/0777; F24B 13/02; F24B 1/205; F24C 1/16  
See application file for complete search history.

(56) References Cited

U.S. PATENT DOCUMENTS 4,541,406 A * 9/1985 DaSambiagio ..... A47J 37/0763  
126/25 A  
4,569,327 A * 2/1986 Velten ................. A47J 37/0763  
126/25 A (Continued)

FOREIGN PATENT DOCUMENTS

CN   202698891 U   1/2013  
JP   S47-009935 A   5/1972

(Continued)

OTHER PUBLICATIONS

International Search Report issued in PCT/KR2016/010985 dated Dec. 8, 2016 (2 pages).

(Continued)

*Primary Examiner* — David J Laux  
(74) *Attorney, Agent, or Firm* — Osha Liang LLP (57) ABSTRACT

An assemblable grill can be dismantled and is easy to clean, and a grill bridge may also be dismantled and is easy to clean. Additionally, the assemblable grill includes first and second stands, and multiple grates assembled such that both side portions thereof are inserted in and coupled to the first and second stands. Furthermore, grates can easily be separated from the first and second stands for cleaning.

7 Claims, 12 Drawing Sheets

(51) Int. Cl.
*A47J 37/07* (2006.01)
*F24B 1/20* (2006.01)
*F24C 1/16* (2006.01)

(52) U.S. Cl.
CPC *A47J 2037/0777* (2013.01); *A47J 2037/0795* (2013.01); *F24C 1/16* (2013.01)

(56) References Cited

U.S. PATENT DOCUMENTS

| | | | | |
|---|---|---|---|---|
| 5,243,961 | A * | 9/1993 | Harris | F24C 1/16 |
| | | | | 126/25 R |
| 5,452,706 | A * | 9/1995 | Meza | A47J 37/0763 |
| | | | | 126/29 |
| 6,439,111 | B1 * | 8/2002 | Lu | A47J 37/0763 |
| | | | | 126/25 R |
| 8,752,539 | B2 * | 6/2014 | Paap | A47J 37/0704 |
| | | | | 126/25 A |
| 2008/0311264 | A1 | 12/2008 | Tippmann et al. | |

FOREIGN PATENT DOCUMENTS

| | | |
|---|---|---|
| JP | S52-032565 U1 | 3/1977 |
| KR | 200196698 Y1 | 9/2000 |
| KR | 20050093031 A | 9/2005 |
| KR | 101407213 B1 | 6/2014 |
| KR | 101425570 B1 | 8/2014 |
| KR | 2014-0120120 A | 10/2014 |

OTHER PUBLICATIONS

Written Opinion issued in PCT/KR2016/010985 dated Dec. 8, 2016 (5 pages).

Ofice Action issued in Japanese Application No. 2018-518490 dated May 21, 2019 (4 pages).

Office Action issued in corresponding CN Application No. 201690001228.5 with partial English translation dated Jan. 25, 2019 (3 pages).

\* cited by examiner

ASSEMBLABLE GRILL AND GRILL BRIDGE HAVING SAME

TECHNICAL FIELD

The present invention relates to an assemblable grill and a grill bridge having the same, and more specifically, to an assemblable grill which is separable for easy washing and a grill bridge having the same.

BACKGROUND ART

Generally, braziers are used to grill various foods desired to be grilled, such as fish, meats, processed foods such as sausages, or the like, to be eaten in the event of camping. A brazier, which is a device for grilling foods desired to be grilled by combusting firewood or charcoal, includes a combustion space in which the combusted firewood or charcoal is combusted and an ash support for collecting ashes generated from the combusted firewood or charcoal.

A grill bridge (also called a brazier table) is used to adjust a gap between a brazier and a grill. The grill bridge has a table structure having an open central portion, and the brazier is installed in the central portion space. Therefore, the various foods to be grilled placed onto the grill above a heat source provided in the brazier are heated and cooked by the heat source.

The conventional grill generally includes a lattice-shaped grill net welded at an edge thereof to be integrally formed. The conventional grill is not preferable in terms of sanitation because it is hard to clean corners thereof at which the welding is performed, and an additional grill should be prepared or it is inconvenient to carry the grill due to its large size.

To solve the problems, Korean Patent Registration No. 10-1425570 (issued on Jul. 25, 2014) and Korean Patent Registration No. 10-14072132 (issued on Jun. 5, 2014) have been proposed.

The grill in Korean Patent Registration No. 10-1425570 includes a body including grill rod accommodating grooves and a plurality of grill rods assembled in the grill rod accommodating grooves so that a grill net is formed. The grill rods are easily separated from the grill rod accommodating grooves of the body, and each of the grill rods is washed, and thus the grill is more easily washable than the conventional integrated grill structure.

The grill disclosed in Korean Patent Registration No. 10-14072132 includes a lateral plate including a plurality of insertion holes and grill rods inserted into the insertion holes so that a grill net is formed, and the grill rods are easily separated from the lateral plate like the grill in Korean Patent Registration No. 10-1425570, and each of the grill rods is washed, and thus the grill is more easily washable than the conventional integrated grill structure.

However, in the grills in Korean Patent Registration No. 10-14072132 and Korean Patent Registration No. 10-14072132, the grill net is formed of the plurality of grill rods with a circular structure in which an upper surface and a lower surface are parallel to each other, and oil discharged from various foods desired to be grilled, which are placed onto the grill net, drops onto a brazier below the grill net along the grill rods, which generates a large amount of smoke including various carcinogenic harmful substances, and thus causing problems such as ruining health of a user.

Technical Problem

The present invention is directed to providing an assemblable grill which is easily washable and a grill bridge including the same.

Further, the present invention is directed to providing an assemblable grill which minimizes generation of smoke including various cancerigenic components by discharging oil discharged from foods desired to be grilled to the outside so as to prevent the oil from directly dropping onto the brazier below the grill, and stably collects the oil discharged from the foods desired to be grilled, and a grill bridge including the same.

Furthermore, the present invention is directed to providing an assemblable grill which is easily installed by anyone among men, women, and children due to a simple structure and convenient assembly and disassembly.

Technical Solution

One aspect of the present invention provides an assemblable grill which includes a first stand and a second stand disposed to face each other and each including a plurality of slots formed in a longitudinal direction, and a plurality of grates having a plate type structure and insertion grooves formed in both sides thereof, wherein one side of the grate is insertion-coupled to the slot of the first stand, and the other side of the grate is insertion-coupled to the slot of the second stand.

Each of the first and second stands may include stands including an upper plate, a lower plate, and a lateral plate to have a 'ㄷ' shape with an open rear side, and include the plurality of slots disposed at regular distances in a longitudinal direction in parallel, extending from the upper plate toward the lateral plate, and allowing the plurality of grates to be insertion-coupled thereinto.

Each of the first and second stands may further include a grip bent upward from a rear side of the upper plate, and a slippage preventing piece bent downward from the rear side of the upper plate, wherein the upper plate has both sides extending in a longitudinal direction to the outsides of both sides of the lower plate to be longer than the lower plate in a longitudinal direction.

Each of the plurality of grates may include a horizontal upper surface and a lower surface having a '^' shape inclined upward from both sides toward the central portion.

Each of the plurality of grates may include a front surface and a rear surface having a flat plate shape, and an oil discharge path may be formed on at least one surface of the front surface and the rear surface.

The assemblable grill may further include first and second fixing pins through-coupled to fixing holes of the plurality of grates having both sides insertion-coupled to the first and second stands in a longitudinal direction of the first and second stands, and configured to fix the plurality of grates to the first and second stands.

Another aspect of the present invention provides a grill bridge which includes a mounting frame on which the assemblable grill is mounted, support legs configured to support both sides of the mounting frame and having a central portion on which a brazier is mounted, and oil supports mounted at outer sides of the support legs to collect the oil dropping from the assemblable grill.

Advantageous Effects

As described above, according to the present invention, the following effects can be obtained.

First, according to the present invention, an assemblable grill includes first and second stands and a plurality of grates having both sides insertion-coupled into the first and second stands, and the grates are easily separated from the first and second stands when the first and second stands and the grates are washed, and thus the first and second stands and the grates can be relatively easily washable.

Second, according to the present invention, grates have a horizontal upper surface, and a lower surface which is inclined upward from both sides thereof toward a central portion thereof, that is, consisting of approximately a 'A' shape, to allow oil discharged from foods desired to be grilled which are placed onto the grates, to be discharged toward the outer side of the grates, that is, toward the first and second stands, along the lower surface disposed inclined from the central portion of the grate, and thus preventing the oil from directly dropping onto the brazier below a grill.

Further, an oil discharge path extending from the central portion of the grate toward both sides thereof is formed on at least one surface of a front surface or a rear surface of the grate to allow the oil discharged in a process of grilling the foods desired to be grilled to be stably discharged toward the outside through the oil discharge path, and thus fundamentally preventing a large quantity of smoke generated when the oil discharged from the foods desired to be grilled directly drops onto the brazier.

Third, according to the present invention, slots are formed in first and second stands to be separated at regular distances, and insertion grooves are formed on both sides of grates to correspond to the slots, such that a grill is easily assembled only by a simple operation of insertion-coupling the slots of the first and second stands into the insertion grooves of the grates to allow anyone among men, women, and children to easily assemble the grill by a simple operation, and thus user convenience can be provided.

Fourth, according to the present invention, fixing pins are through-coupled to fixing holes of grates in a longitudinal direction of first and second stands while the grates are coupled and assembled to the first and second stands, and both sides of the grates are stably fixed to the stands of the first and the second stands by using fixing pins to prevent the grates from being individually detached from the first and second stands due to careless of a user while the grill is used, and thus user injury caused by detachment of the grates can be fundamentally prevented.

Fifth, according to the present invention, finger hook protrusions protruding outward are provided on both sides of grates, and thus the grates can be easily separated from first and second stands by a simple operation in which fingers of a user hook the finger hook protrusions to lift the grates upward when the user tries to separate the grates, which are insertion-coupled to the first and second stands, from the first and second stands.

Sixth, according to the present invention, first and second stands include at least one slippage preventing piece bent downward from a rear side of an upper plate of the stands, and the movement of stands in a mounting frame of a grill bridge is limited, and thus the stands can be stably mounted.

MODES OF THE INVENTION

Hereinafter, technical features of the present invention will be described in detail with reference to the accompanying drawings.

Figure 1:
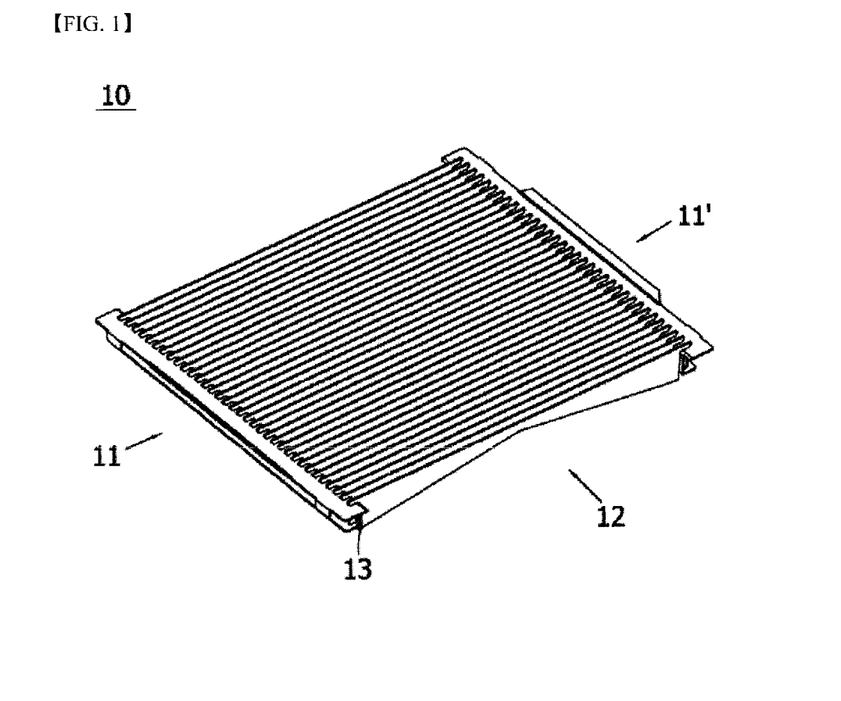
FIG. 1 is a perspective view showing an assembly of an assemblable grill according to one embodiment of the present invention.
Figure 2:
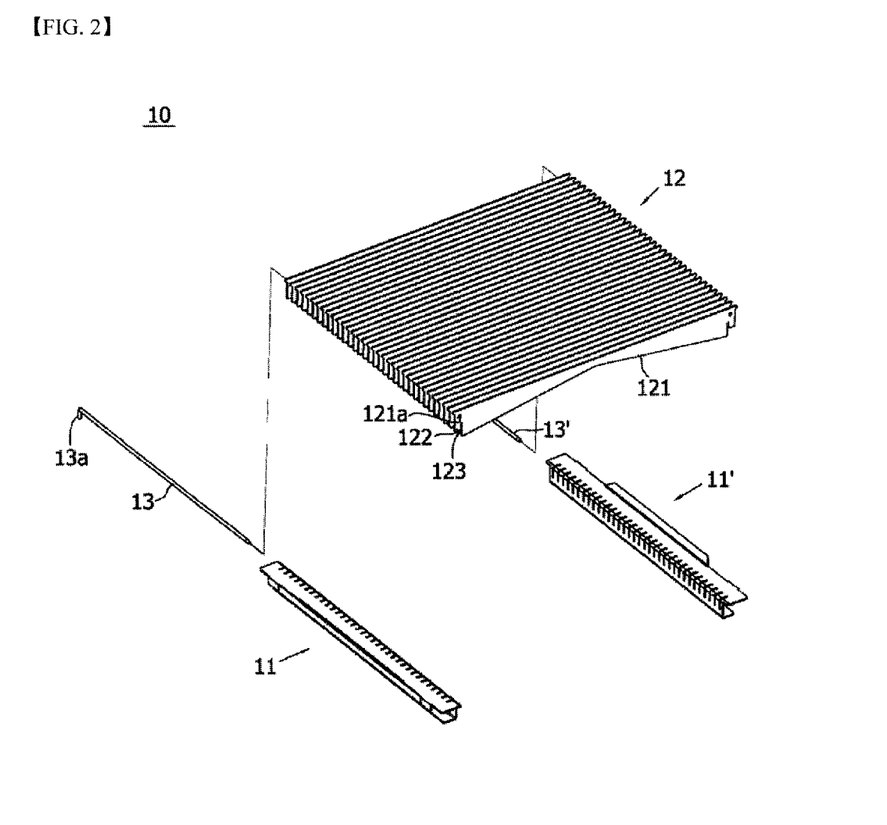
FIG. 2 is an exploded perspective view of the assemblable grill shown in FIG. 1.
Figure 3:
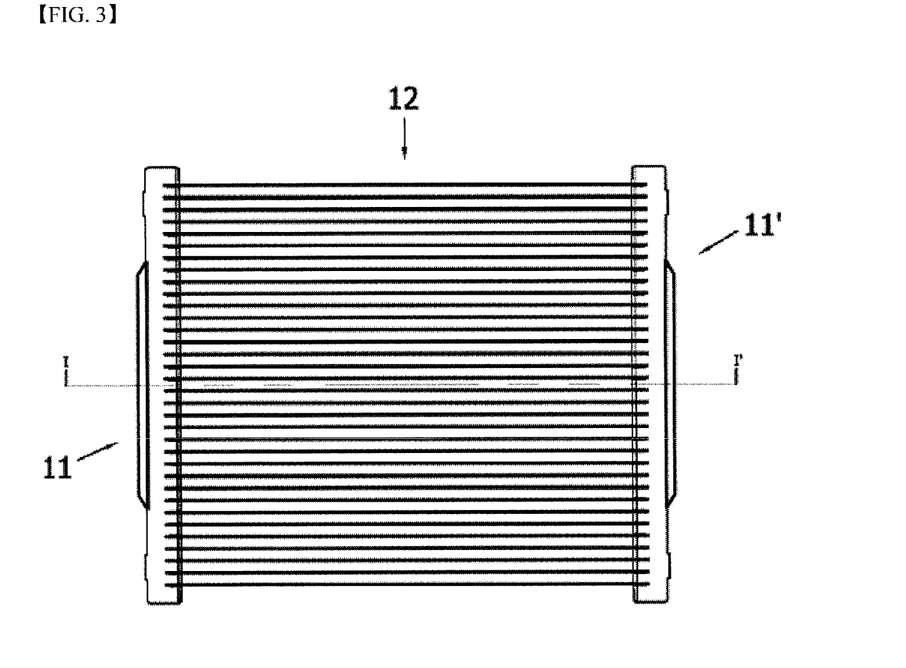
FIG. 3 is a plan view of the assemblable grill shown in FIG. 1 when viewed from above.

FIG. 1 is a perspective view showing an assembly of an assemblable grill according to one embodiment of the present invention, FIG. 2 is an exploded perspective view of the assemblable grill shown in FIG. 1, FIG. 3 is a plan view of the assemblable grill shown in FIG. 1 when viewed from above, FIG. 4A is a front view showing the assemblable grill shown in FIG. 1, and FIG. 4B is a cross-sectional view taken along line I-I' shown in FIG. 3.

Referring to FIGS. 1 to 4, an assemblable grill 10 according to one embodiment of the present invention includes first and second stands 11 and 11' which are symmetrical to each other, and a plurality of grates 12 disposed between and insertion-coupled to the first and second stands 11 and 11' to be assembled. Further, the assemblable grill 10 according to one embodiment of the present invention includes first and second fixing pins 13 and 13' through-coupled to the plurality of grates 12 in a longitudinal direction of the first and second stands 11 and 11'.

Figure 5A:
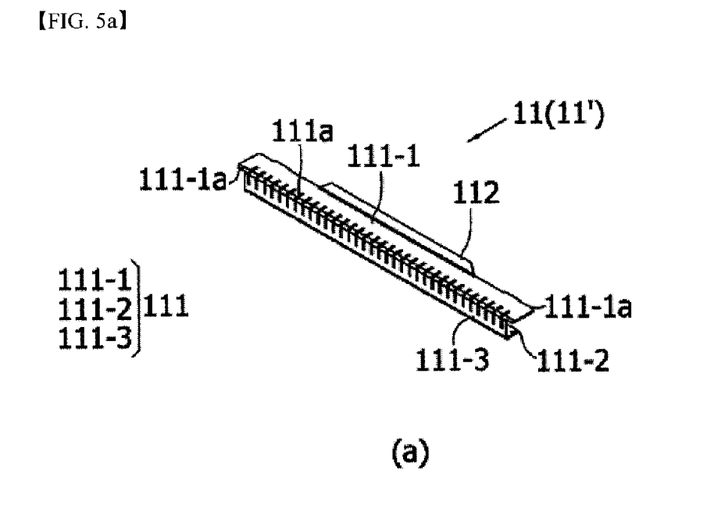
FIG. 5 shows perspective views for describing structures of first and second stands shown in FIG. 1.
Figure 5B:
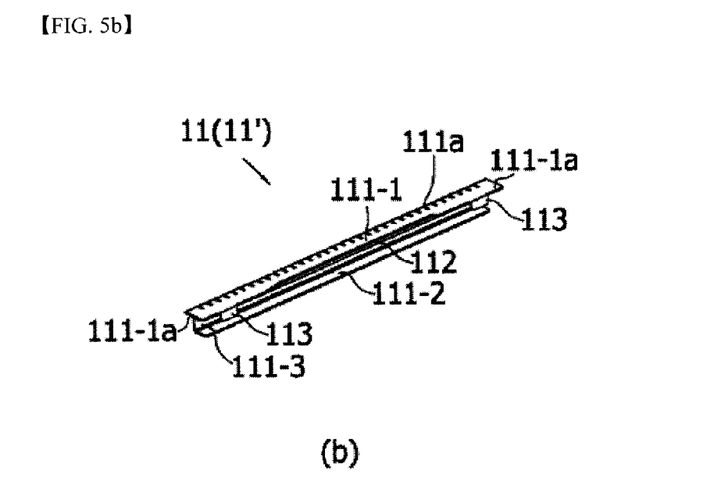

FIG. 5 shows perspective views for describing structures of the first and second stands shown in FIG. 1, FIG. 5A is a perspective view of the first and second stands when viewed from the front, and FIG. 5B is a perspective view of the first and second stands shown in FIG. 5A when viewed from the rear.

Referring to FIG. 5A, each of the first and second stands 11 and 11' includes a stand 111 including an upper plate 111-1, a lower plate 111-2, and a lateral plate 111-3 formed to connect the upper plate 111-1 with the lower plate 111-2 frontward and having a '⊏' shape with an open rear side.

Figure 9:
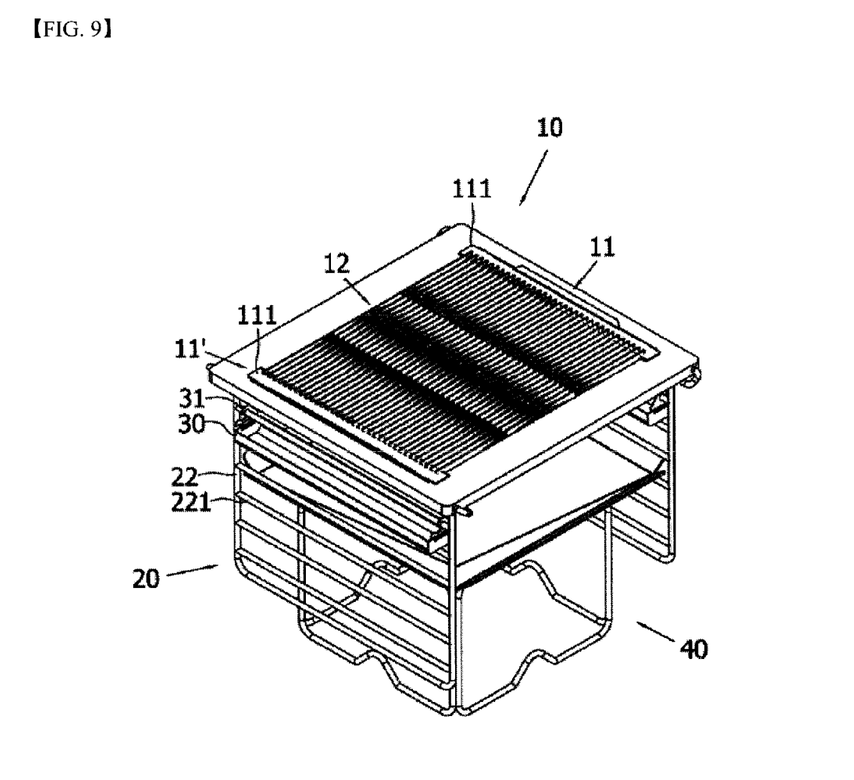
FIG. 9 is a perspective view showing an assembly of a grill bridge according to one embodiment of the present invention.

As shown in FIGS. 5A and 5B, the upper plate 111-1 includes an extending piece 111-1a having both sides extending in a longitudinal direction to the outsides of both sides of the lower plate 111-2 to be longer than the lower plate 111-2 so that the first and second stands 11 and 11' are disposed on the mounting frame 21 of the grill bridge 20 (see FIG. 9).

The stand 111 includes a plurality of slots 111a into which the plurality of grates 12 are insertion-coupled and which extend from the upper plate 111-1 toward the lateral plate 111-3 and are formed at regular distances in a line in a longitudinal direction. In this case, the gap between the slots 111a maintains a gap between the insertion-coupled grates 12 by a predetermined size, and has a size of 0.6 to 1 mm, preferably 0.8 mm, so as not to hinder oil discharged from the various foods desired to be grilled from being discharged to both sides of the grates 12.

The stand 111 further includes a grip 112 protruding upward from a rear side of the upper plate 111-1. In this case, the grip 112 is bent to be inclined outward from a rear side of the upper plate 111-1 so that a user grips the stand 111 with fingers and lifts the stand 111.

As shown in FIG. 5B, the stand 11 further includes at least one sliding preventing piece 113 bent downward from a rear side of the upper plate 111-1. While the stand 111 is disposed on an inner side of the mounting frame 21 of the grill bridge 20 (see FIG. 9), the sliding preventing piece 113 is pressed against an inner side of the mounting frame 21 to prevent the stand 111 from sliding toward an inner side of the mounting frame 21 in a process of grilling the foods desired to be grilled.

Figure 6A:
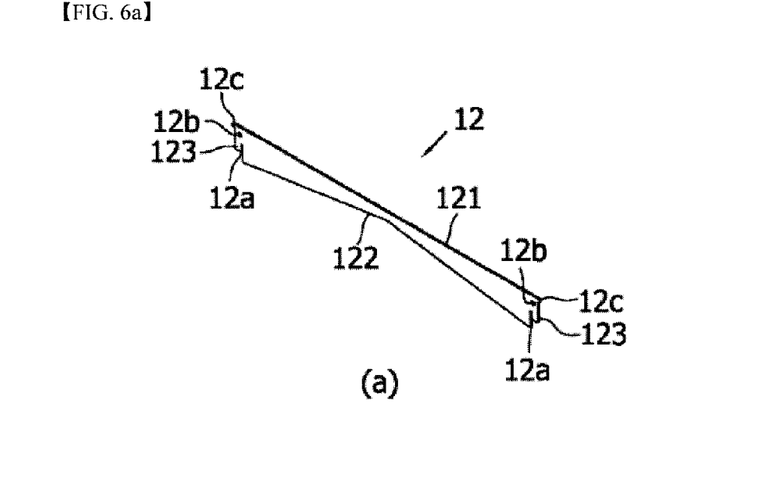
FIG. 6 shows views for describing a grate shown in FIG. 1.
Figure 6B:
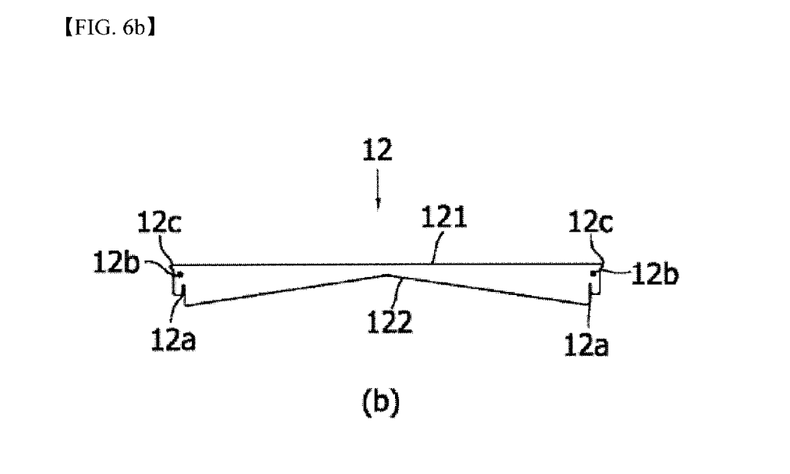

FIG. 6 shows views for describing a grate shown in FIG. 1, FIG. 6A is a perspective view of the grate, and FIG. 6B is a front view of the grate shown in FIG. 6A.

Referring to FIG. 6, the grate 12 has a flat plate shape having flat front and rear surfaces and includes insertion grooves 12a formed in both sides thereof in a longitudinal direction to be insertion-coupled to the slots 111a of the first and second stands 11 and 11'. In this case, the insertion grooves 12a are formed at a lower side of the grate 12 as a long groove vertically extending lengthily, and has one side which is open toward a lower side of the grate 12 so that the slots 111a of the first and second stands 11 and 11' are insertion-coupled to the insertion grooves 12a through the open side.

As shown in FIGS. 2 and 6, the grates 12 include fixing holes 12b formed in both sides thereof so that the fixing pins 13 and 13' are coupled therethrough. Therefore, while the plurality of grates 12 are insertion-coupled to the first and second stands 11 and 11', the adjacent grates 12 are fixed to each other by the first and second fixing pins 13 and 13' through-coupled to the fixing holes 12b of the grates 12 in a longitudinal direction of the first and second stands 11 and 11' are grouped, and thus the grill net on which the foods desired to be grilled are put is formed.

Figure 4:
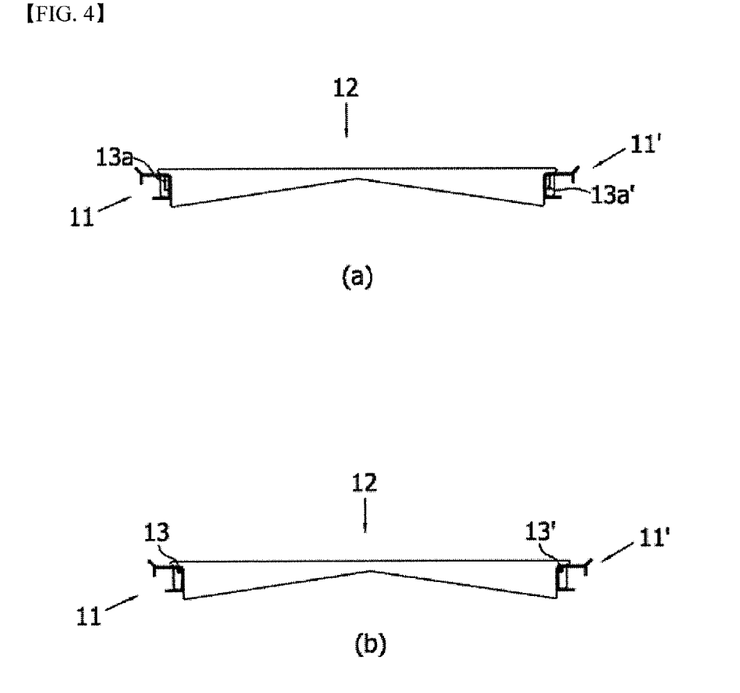
FIG. 4 shows views for describing the assemblable grill shown in FIG. 1.

As shown in FIGS. 2 and 4, the fixing pins 13 and 13' include grips 13a and 13a' formed at an end portions thereof so that the grates 12 are coupled to the first and second stands 11 and 11' through the fixing holes 12b of the grates 12 in a longitudinal direction of the first and second stands 11 and 11' while a user easily grips the grips 13a and 13a'.

As shown in FIG. 6, the grate 12 further includes catching protrusions 12c protruding outward from both sides thereof. As shown in FIG. 1, when a user tries to separate the grates 12 from the first and second stands 11 and 11' while the catching protrusions 12c are insertion-coupled to the slots 111a of the first and second stands 11 and 11', fingers of a user are caught by the catching protrusions 12c, and thus the grates 12 are easily separated from the first and second stands 11 and 11'.

As shown in FIG. 6A, the grate 12 includes a horizontal upper surface 121 and a lower surface 122 which is inclined upward from the both sides thereof toward the center thereof, that is, has approximately a '^' shape. Therefore, oil discharged from the foods desired to be grilled which are placed onto the grates 12, is discharged to both sides of the grates 12 along a lower surface 122 which is inclined upward from both sides of the grates 12 toward both sides thereof, rather than directly dropping from the center of the grates 12 to the brazier below the grates 12.

As shown in FIG. 6A, the grate 12 has end portions 123 formed on both sides thereof and having lower portions (outer sides of the insertion grooves 12a) shorter than other portions, and thus the insertion grooves 12a of the grates 12 are conveniently insertion-coupled to the slots 111a of the stand 111.

However, the thickness of grate 12 is 1.5 T, preferably in a range of 1.0 to 2.0 T, such that the oil discharged from the foods desired to be grilled, which are placed onto the grates 12, is stably discharged.

Figure 7A:
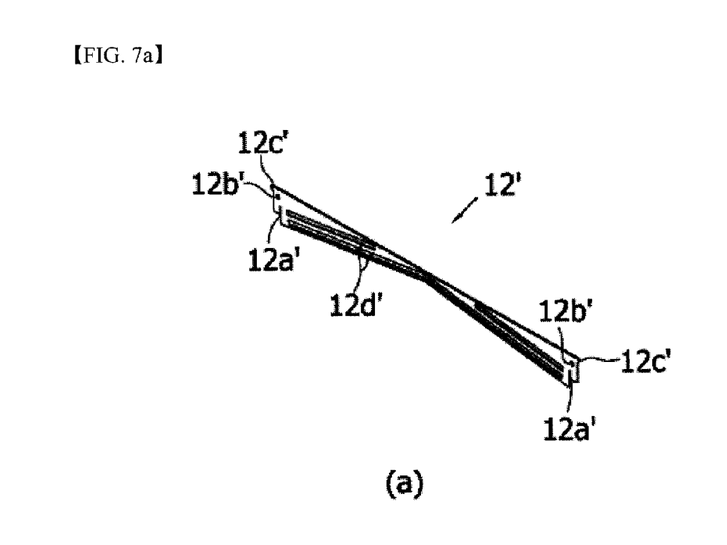
FIG. 7 shows views for describing a grate according to another embodiment of the present invention.
Figure 7B:
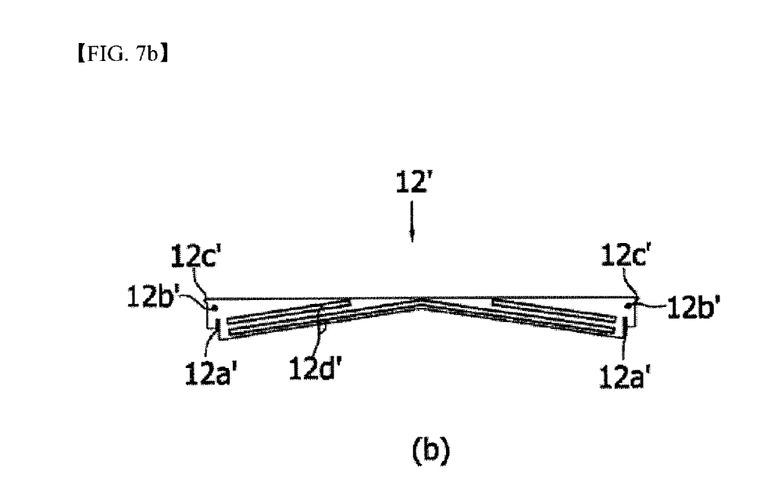

FIG. 7 shows views for describing a grate according to another embodiment of the present invention, FIG. 7A is a perspective view of the grate, and FIG. 7B is a front view of the grate shown in FIG. 7A.

Referring to FIG. 7, like the grate 12 shown in FIG. 6, a grate 12' according to one embodiment of the present invention includes an insertion groove 12a', a fixing hole 12b', and a catching protrusion 12c'. In addition, the grate 12' includes an oil discharge path 12d' formed on at least one surface of a front surface or a rear surface thereof and allowing oil discharged from foods desired to be grilled, which are placed onto the grate 12', to be stably discharged to the outside of the grate 12' rather than dropping onto the brazier below the grate 12'.

The oil discharge path 12d' has a bar shape extending from the center of the grates 12' to both sides thereof, or has a structure continuously connected in a longitudinal direction of the grate 12' without cutting. Further, the oil discharge path 12d' may have a '^' shape to correspond to a lower surface structure of the grate 12'.

As shown in FIG. 7, the oil discharge path 12d' has a groove (concave) structure, but is necessarily not limited to the groove structure, and may include a convex (embossed) structure. For example, the oil discharge path 12d' has a groove formed in a front surface thereof and a convex structure formed at a rear surface to correspond to the groove formed at the front surface thereof. Further, the oil discharge path 12d' may be disposed in a vertically stacked manner or may be disposed in a single layer structure.

Like the grate 12' according to one embodiment of the present invention, an oil discharge path 12d' extending from the center of the grate 12' toward both sides thereof is formed on at least one surface of a front surface and a rear surface of the grate 12', and thus the oil discharged from the foods desired to be grilled, which are placed onto the grate 12', is introduced into the oil discharge path 12d' in a process of flowing downward along a surface of the grate 12', moves along the oil discharge path 12d' inclined downward from a rear central portion toward both sides thereof, and flows and is discharged toward both sides of the grate 12', that is, the first and second stands 11 and 11'.

Therefore, the grate 12' according to one embodiment of the present invention can fundamentally prevent a large quantity of smoke generated when the oil discharged from the foods desired to be grilled directly drops onto the brazier by stably discharging the oil discharged along an oil discharge path 12d' formed on at least one surface of the front surface or the rear surface of the grate 12' to the outside in a process of grilling the foods desired to be grilled.

FIG. 8 shows views for describing a process in which the grate according to the present invention is coupled to the first and second stands.

Figure 8A:
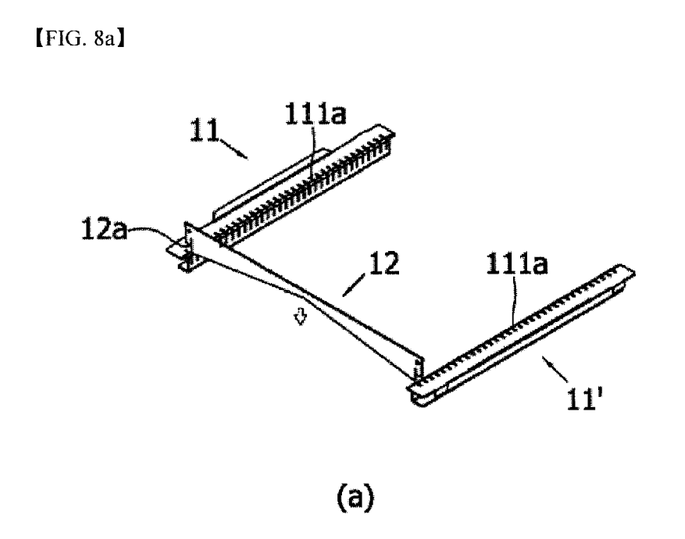
FIG. 8 shows views for describing a process of coupling the grate according to one embodiment of the present invention to first and second stands.
Figure 8B:
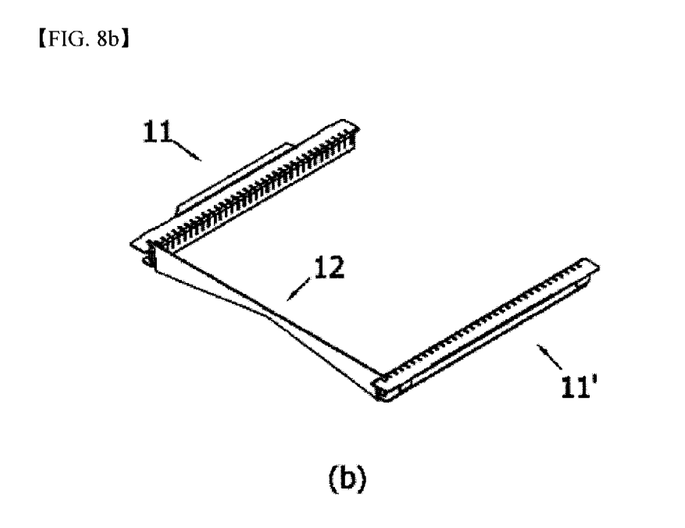

As shown in FIGS. 8A and 8B, while the first and second stands 11 and 11' are disposed to face each other, the grate 12 is positioned at upper portions of the first and second stands 11 and 11' and is moved downward, and the slots 111a of the first and second stands 11 and 11' are insertion-coupled to the insertion grooves 12*a* formed at both sides of the grate 12, and thus the grate 12 is assembled into a gap between the first and second stands 11 and 11'. In the same manner, the other grates are sequentially assembled to the first and second stands 11 and 11', and thus a grill net is assembled as shown in FIG. 1.

As described above, in the assemblable grill 10 according to the embodiment of the present invention, the slots 111*a* are formed at the first and second stands 11 and 11' to be separated from each other at regular distances, and the insertion grooves 12*a* are formed at both sides of the grate 12 to correspond to the slots 111*a*, and thus the grill net may be easily assembled by anyone among men, women, and children with a mere simple operation in which the slots 111*a* of the first and second stands 11 and 11' are insertion-coupled to the insertion grooves of the grate 12 to provide convenience of use and to be widely popularized.

Further, in the assemblable grill 10 according to one embodiment of the present invention, while the plurality of grates 12 are coupled and assembled to the first and second stands 11 and 11', the fixing pins 13 and 13' are through-coupled to the fixing holes 12*b* of the plurality of grates 12 in a longitudinal direction of the first and second stands 11 and 11' as shown in FIG. 2, and thus the both sides of the plurality of grates 12 are stably fixed to the first and second stands 11 and 11' by the fixing pins 13 and 13' in the stand 111 of the first and second stands 11 and 11'. Therefore, the assemblable grill 10 can prevent damage to a user by preventing the plurality of grates 12 from being individually separated from the first and second stands 11 and 11' due to carelessness of the user during use.

Figure 10:
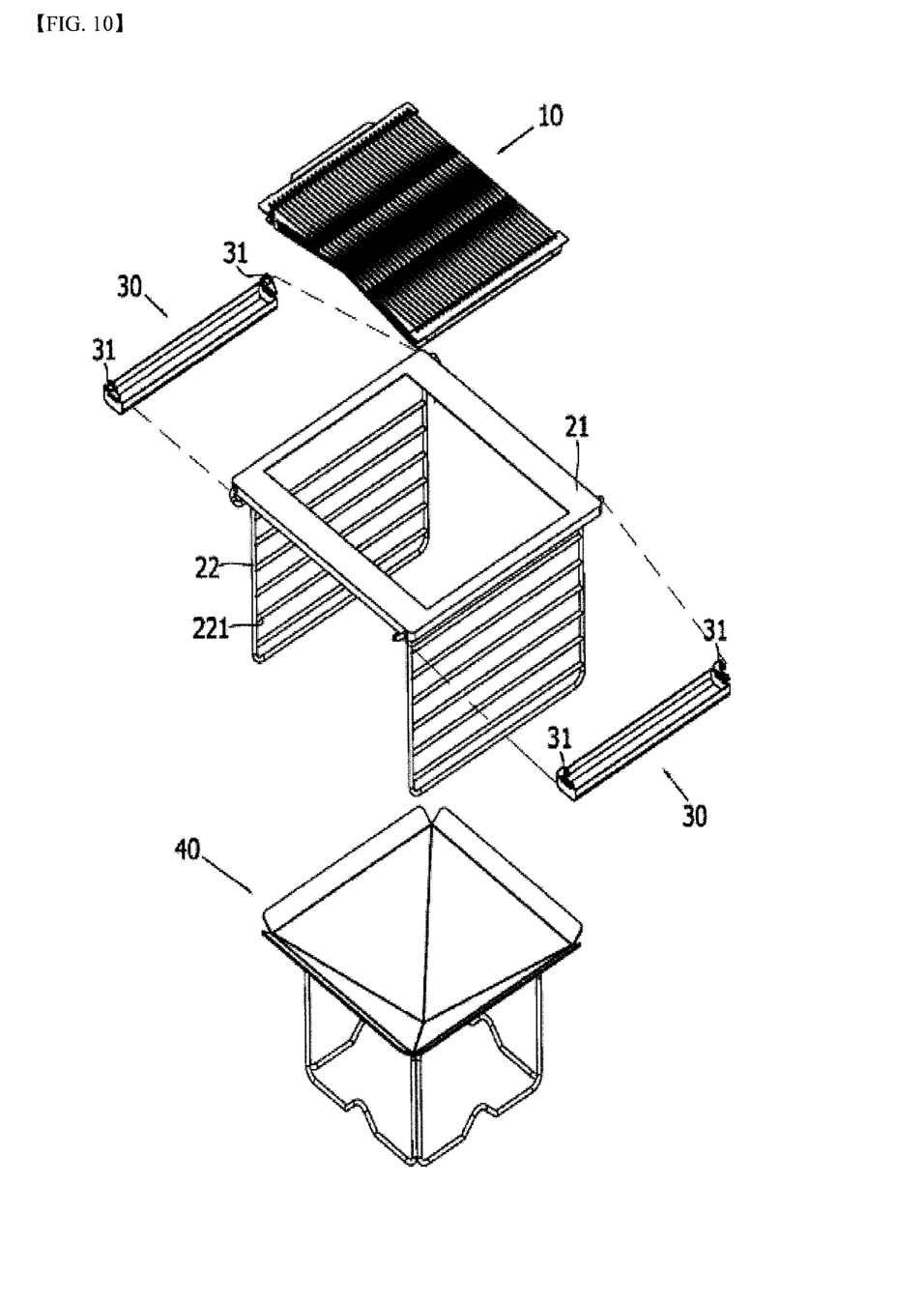
FIG. 10 is an exploded perspective view of the grill bridge shown in FIG. 9.
Figure 11:
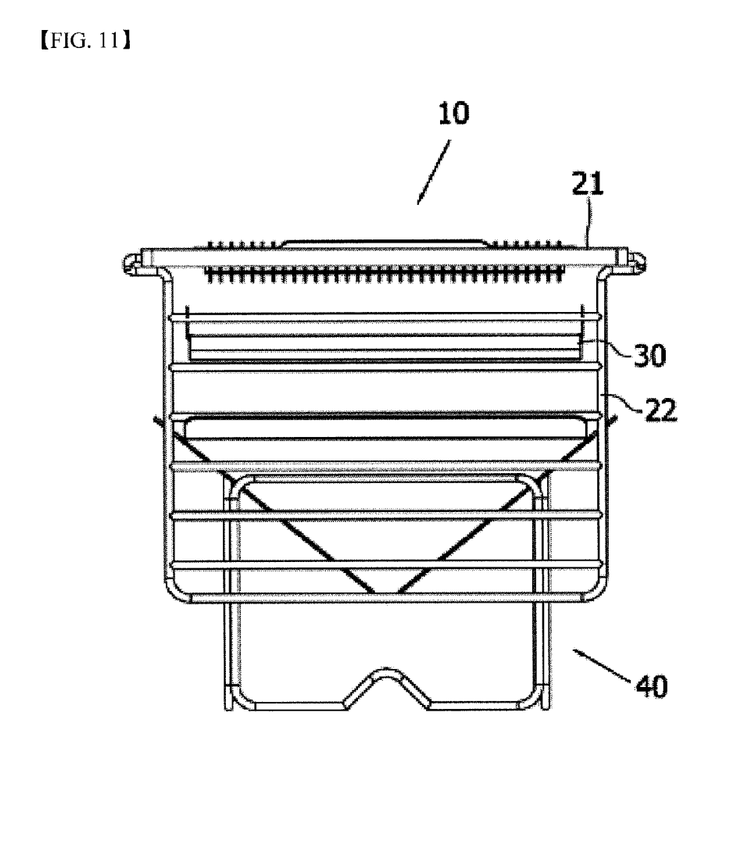
FIG. 11 is a front view of the grill bridge shown in FIG. 9.
Figure 12:
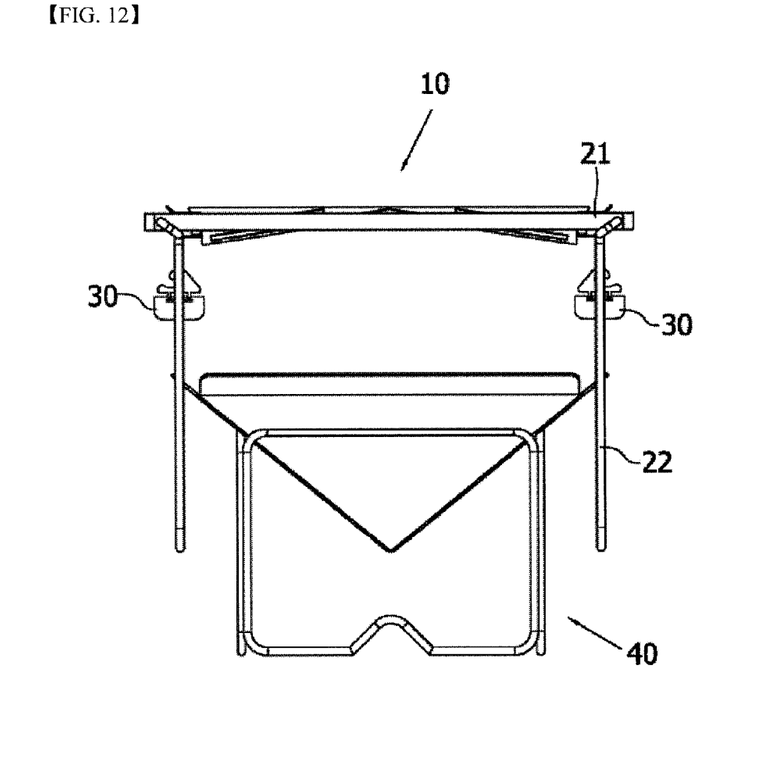
FIG. 12 is a lateral view of the grill bridge shown in FIG. 9.

FIG. 9 is an assembled perspective view for describing a grill bridge according to one embodiment of the present invention, FIG. 10 is an exploded perspective view of the grill bridge shown in FIG. 9, FIG. 11 is a front view of the grill bridge shown in FIG. 9, and FIG. 12 is a lateral view of the grill bridge shown in FIG. 9.

Referring to FIGS. 9 to 12, the grill bridge 20 according to one embodiment of the present invention includes a mounting frame 21 on which the grill 10 is mounted, and support legs 22 which support both sides of the mounting frame 21 to be separated from the ground to a predetermined height and have a central portion in which the brazier 40 is mounted. Further, the grill bridge 20 may include an oil support 30 mounted at an outer side of the support leg 22.

As shown in FIG. 10, the mounting frame 21 has an open central portion into which the grill 10 is inserted by a predetermined depth. Therefore, as shown in FIG. 10, while both sides of the first and second stands 11 and 11', that is, both sides of the stand 111 in a longitudinal direction (extending pieces), are mounted on the mounting frame 21, a lower portion of the grill is partially inserted into the central portion of the mounting frame 21.

As shown in FIGS. 10 and 11, the support legs 22 are rotatably coupled to both sides of the mounting frame 21 in a symmetrical structure and support the mounting frame 21 to be separated from the ground a predetermined height. The support legs 22 are rotatably hinge-coupled to both sides of the mounting frame 21 and are folded so that the support legs 22 face the mounting frame 21 in parallel when the grill bridge 20 is not used, and thus the assemblable grill 10 can be easily moved and stored.

The support legs 22 have a ladder form having a plurality of holding rods 221 vertically stacked in a multi-stage manner. As shown in FIG. 11, the support leg 22 includes a space portion provided in the center thereof so that the brazier 40 is installed therein, and the oil support 30 is mounted on the outer side of the space portion, preferably, the outer side of a direction in which the first and second stands 11 and 11' of the grill 10 are mounted.

As shown in FIG. 10, the oil support 30 includes hook portions 31 formed on both sides thereof in a longitudinal direction and mounted on the holding rods 221 of the support legs 22. In this case, as shown in FIG. 11, the oil supports 30 are at least partially positioned to overlap the first and second stands 11 and 11' of the grill 10 in a width direction (a direction in which the oil support 30 is mounted) while being mounted on the holding rods 221 of the support legs 22. Therefore, the oil introduced to the first and second stands 11 and 11' from the grates 12 of the grill drops onto the first and second stands 11 and 11' to be collected to the oil support 30.

However, in the present invention, the structures and the shapes of the support legs 22 and the brazier 40 except the assemblable grill 10 are not limited and may vary.

The technical scope of the present invention described above has been described in detail according to the exemplary embodiments, however, the exemplary embodiments are provided to describe the technical scope of the present invention and do not limit the technical scope of the present invention. Therefore, it should be understood by those of skilled in the art that various embodiments may be made within the technical scope of the present invention.

DESCRIPTION OF SYMBOLS

10: ASSEMBLABLE GRILL
11: FIRST STAND
11': SECOND STAND
12: GRATE
13: FIRST FIXING PIN
13': SECOND FIXING PIN
20: GRILL BRIDGE
30: OIL SUPPORT
40: BRAZIER

The invention claimed is:

1. An assemblable grill comprising:
a first stand and a second stand disposed to face each other and each including a plurality of slots formed in a longitudinal direction; and
a plurality of grates having a plate type structure and insertion grooves formed in sides thereof, wherein one side of the grate is insertion-coupled to the slot of the first stand, and another side of the grate is insertion-coupled to the slot of the second stand,
wherein each of the first and second stands includes stands including an upper plate, a lower plate, and a lateral plate to have a 'ㄷ' shape with an open rear side, and includes the plurality of slots disposed at regular distances in a longitudinal direction in parallel, extending from the upper plate toward the lateral plate, and allowing the plurality of grates to be insertion-coupled thereinto.

2. The assemblable grill of claim 1, wherein each of the first and second stands further includes a grip bent upward from a rear side of the upper plate, and a slippage preventing piece bent downward from the rear side of the upper plate, wherein the upper plate has both sides extending in a longitudinal direction to outsides of both sides of the lower plate to be longer than the lower plate.

3. The assemblable grill of claim 1, wherein each of the plurality of grates includes a horizontal upper surface and a lower surface having a '^' shape inclined upward from both sides toward the central portion.

4. The assemblable grill of claim 1, wherein each of the plurality of grates includes a front surface and a rear surface having a flat plate shape, and an oil discharge path is formed on at least one surface of the front surface and the rear surface.

5. The assemblable grill of claim 1, further includes first and second fixing pins through-coupled to fixing holes of the plurality of grates having both sides insertion-coupled to the first and second stands in a longitudinal direction of the first and second stands, and configured to fix the plurality of grates to the first and second stands.

6. A grill bridge comprising:
a mounting frame on which the assemblable grill of claim 1 is mounted;
support legs configured to support sides of the mounting frame and having a central portion on which a brazier is mounted; and
oil supports mounted at outer sides of the support legs to collect the oil dropping from the assemblable grill.

7. A grill bridge comprising:
a mounting frame on which an assemblable grill is mounted, wherein the assemblable grill comprises:
first stand and a second stand disposed to face each other and each including a plurality of slots formed in a longitudinal direction,
a plurality of grates having a plate type structure and insertion grooves formed in sides thereof, wherein one side of the grate is insertion-coupled to the slot of the first stand, and another side of the grate is insertion-coupled to the slot of the second stand, and
first and second fixing pins through-coupled to fixing holes of the plurality of grates having both sides insertion-coupled to the first and second stands in a longitudinal direction of the first and second stands, and configured to fix the plurality of grates to the first and second stands;
support legs configured to support sides of the mounting frame and having a central portion on which a brazier is mounted; and
oil supports mounted at outer sides of the support legs to collect the oil dropping from the assemblable grill.

* * * * *